Figure 1:
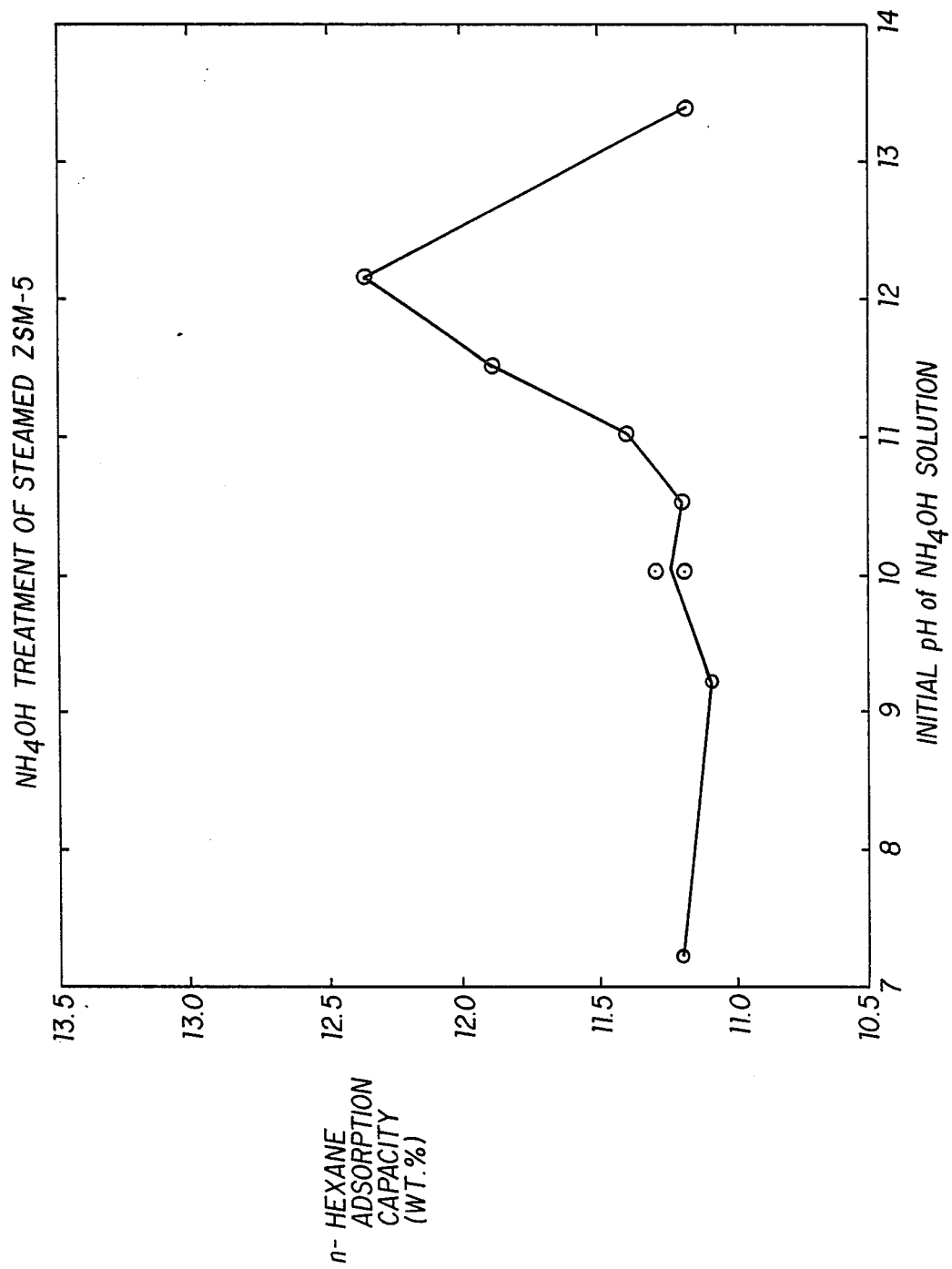

United States Patent [19]

Degnan, Jr.

[11] Patent Number: 4,863,885

[45] Date of Patent: Sep. 5, 1989

[54] METHOD FOR INCREASING THE HYDROCARBON SORPTION CAPACITY OF A ZEOLITE

[75] Inventor: Thomas F. Degnan, Jr., Yardley, Pa.

[73] Assignee: Mobil Oil Corp., New York, N.Y.

[21] Appl. No.: 866,550

[22] Filed: May 23, 1986

Related U.S. Application Data

[63] Continuation-in-part of Ser. No. 774,614, Sep. 10, 1985, abandoned.

[51] Int. Cl.$^4$ .............................................. B01J 38/66
[52] U.S. Cl. ...................................... 502/86; 423/328
[58] Field of Search ................ 423/328 E, 326, 327, 423/331, 332; 502/85, 86, 74, 77

[56] References Cited

U.S. PATENT DOCUMENTS

| | | | |
|---|---|---|---|
| 3,140,253 | 7/1964 | Plank et al. | 423/328 |
| 3,374,182 | 3/1968 | Young | 423/328 |
| 3,391,088 | 7/1968 | Plank et al. | 423/328 |
| 4,151,189 | 4/1979 | Rubin et al. | 423/329 |
| 4,187,283 | 2/1980 | Kokutailo et al. | 423/328 |
| 4,324,696 | 4/1982 | Miale | 423/328 |
| 4,335,020 | 6/1982 | Chu et al. | 502/85 |
| 4,341,748 | 7/1982 | Plank et al. | 423/328 |
| 4,346,067 | 8/1982 | Wachter | 423/328 |
| 4,435,516 | 3/1984 | Chang et al. | 502/77 |
| 4,477,584 | 10/1984 | Kaeding | 502/85 |
| 4,536,485 | 8/1985 | Topp-Jorgenson | 502/86 |
| 4,550,090 | 10/1985 | Degnan et al. | 502/30 |
| 4,552,739 | 11/1985 | Kuhl | 423/332 |
| 4,556,550 | 12/1985 | Ross et al. | 423/328 |
| 4,599,475 | 7/1986 | Kresege et al. | 585/481 |
| 4,683,214 | 7/1987 | Angevine et al. | 502/74 |

FOREIGN PATENT DOCUMENTS

| | | | |
|---|---|---|---|
| 0130809 | 11/1984 | European Pat. Off. | 502/77 |
| 0134330 | 3/1985 | European Pat. Off. | 502/54 |

OTHER PUBLICATIONS

K. Foger et al., "Channel Arrangement and Activity of Some ZSM Zeolites", Zeolites, vol. 4, No. 4, Oct. 1984, pp. 337–345.

Hiromi Nakamoto et al., "Hydrophobic Natures of Zeolite ZSM-5", Zeolites, vol. 2, No. 2, Apr. 1982, pp. 67–68.

Rabo, Zeolite Chemistry and Catalysis–ACS Monograph 171, 1976, pp. 67–70, 296–297.

Breck, Zeolite Molecular Sieves, John Wiley & Sons, 1974, pp. 640–645.

Primary Examiner—John Doll
Assistant Examiner—R. Bruce Breneman
Attorney, Agent, or Firm—Alexander J. McKillop; Charles J. Speciale; Dennis P. Santini

[57] ABSTRACT

A method is disclosed for increasing the hydrocarbon sorption capacity of a highly siliceous shape-selective zeolite by exposing the zeolite to an aqueous solution having an initial pH ranging between about 10.5 to about 14. The method is particularly useful for treating steam deactivated zeolites.

14 Claims, 6 Drawing Sheets

METHOD FOR INCREASING THE HYDROCARBON SORPTION CAPACITY OF A ZEOLITE

This case is a continuation-in-part of U.S. application Ser. No. 774,614, filed Sept. 10, 1985, now abandoned.

This invention relates to a method for increasing the hydrocarbon sorption capacity of zeolites which may be used in hydrocarbon conversion processes. More particularly, the invention relates to a method for treating a zeolite by contacting it with an aqueous ammonia solution having a pH ranging between about 10.5 to 14 under conditions conducive to hydrocarbon sorption enhancement of the zeolite.

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of small cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline materials such as aluminosilicates. These materials can be described as a rigid three-dimensional framework of $XO_4$ and $YO_4$ wherein X is silicon and/or germanium, and Y is one or more of alumina, gallium, iron, chromium, vanadium, molybdenum arsenic, manganese, or boron. This framework is comprised of tetrahedra which are cross-linked by the sharing of oxygen atoms whereby the ratio of the total Y and X atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of Y to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given zeolite by suitable selection of the cation. The spaces between the tetrahedra are occupied by molecules of water prior to dehydration.

Many processes are known for enhancing the catalytic activity of zeolites used in hydrocarbon conversion processes. For example, U.S. Pat. No. 3,326,797 to Young discloses a method of improving adsorptive capacity and catalytic activity of catalysts such as those prepared from zeolites X, Y or mordenite having a silica to alumina molar ratio between 6 and 12 by contacting with an aqueous alkali metal hydroxide solution having a pH of at least 10.5. The hydroxide is believed to leach out a significant proportion of the structural silica in the zeolite which increases the number of accessible pores without decreasing crystallinity. U.S. Pat. No. 3,929,669 to Rosback et al teaches a method for enhancing olefin sorption and catalytic activity of X-type zeolites which comprises treating a bound zeolitic mass with caustic solution such as aqueous sodium hydroxide. The treatment opens plugged passages within the zeolite while reducing catalytic activity. It is also known in the art to utilize ammonia in zeolite treatments. U.S. Pat. No. 4,139,433 to Ward discloses the treatment of a large pore (7-15 angstrom) noble metal-containing zeolite having a silica to alumina mole ratio of about 3 to 10 which has been subjected to hydrocarbon conversion conditions. The zeolite is contacted with aqueous ammonia in order to redisperse noble metal throughout the catalyst and exchange out alkali metal ions. No mention is made of the sorption capacity of the resulting zeolite. U.S. Pat. No. 4,435,516 to Chang et al discloses a method for increasing catalytic activity in a zeolite by contact with aluminates in the presence of ammonia.

U.S. application Ser. No. 774,515 filed Sept. 10, 1985 discloses a method for purifying zeolitic materials comprising a plurality of solid crystalline phases by contact with an aqueous hydroxide solution.

The acid activity of a zeolite is determined by the number, strength, and accessibility of its acid sites. The accessibility, in turn, is a function of zeolite pore size and the "openness" of the pores. Openness, for example, can be quantified by the degree to which the zeolite adsorbs small molecules. For shape selective reactions it is frequently desirable to maximize the latter property while leaving the pore size unmodified.

It has now been found that the sorptive capacity of a fresh highly siliceous shape-selective zeolite can be increased without changing the zeolite pore size or its diffusivity. Diffusivity is a measure of the mobility of a species through a porous medium. Diffusion occurs by a natural process which tends to diminish any inequalities in composition.

The present invention relates to a method for increasing the hydrocarbon sorption capacity of a fresh zeolite having a silica to alumina molar ratio of at least about 12 and a constraint index ranging between about 1 and about 12 which comprises contacting said zeolite with an aqueous ammonia solution having a pH ranging between about 10.5 and about 14 until the hydrocarbon sorption capacity of the zeolite is increased. Preferably, the pH range of the aqueous ammonia solution ranges between about 12 and about 13.

The method of the present invention is also concerned with the treatment of fresh, "as-synthesized" shape selective zeolites which are highly siliceous. As-synthesized zeolites may be described as those which are not treated after crystallization other than by washing and drying. Such zeolites have not been treated to exchange out catalytically deleterious ions or to remove organic obstructions of the zeolite pores. Such zeolites may have a silica to alumina molar ratio greater than 12, 70, 100, or even greater than 200. The zeolites treated include, ZSM-5, ZSM-11, ZSM-5/ZSM-11, ZSM-12, ZSM-23, ZSM-35, ZSM-38 and ZSM-48.

The present invention is particularly well-suited to use in enhancing the sorption capacity of shape-selective zeolites having very low alkali metal content. Such zeolites can be prepared by utilizing, inter alia, a monoalkylamine having 2 to 9 carbons, e.g., n-propylamine, in the zeolite forming mixture as shown in U.S. Pat. No. 4,151,189, incorporated herein by reference. The alkali metal content of such zeolites is less than about 1400 ppm by weight, say less than about 1000 ppm or less than about 300 ppm, for example, about 100 to 1000 ppm. The present invention is particularly useful when applied to low alkali metal content materials because enhancement of hydrocarbon sorption by the invention is not dependent on the removal of alkali metal cations from the pores of the zeolites so treated.

ZSM-5 is described in greater detail in U.S. Pat. Nos. 3,702,886 and Re. 29,948. The entire descriptions contained within those patents, particularly the X-ray diffraction pattern of therein disclosed ZSM-5, are incorporated herein by reference.

ZSM-11 is described in greater detail in U.S. Pat. No. 3,709,979. That description, and in particular the X-ray diffraction pattern of said ZSM-11, is incorporated herein by reference.

ZSM-5/ZSM-11 intermediate compositions are described in U.S. Pat. No. 4,229,424. That description, and in particular the X-ray diffraction pattern of said compositions disclosed therein, is incorporated herein by reference.

ZSM-12 is described in U.S. Pat. No. 3,832,449. That description, and in particular the X-ray diffraction pattern disclosed therein, incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, particularly the X-ray diffraction pattern thereof, is incorporated herein by reference.

ZSM-38 is more particularly described in U.S. Pat. No. 4,046,859. The description of that zeolite, particularly the specified X-ray diffraction pattern thereof, is incorporated herein by reference.

ZSM-48 is more particularly described in U.S. Pat. No. 4,234,231, the entire content of which is incorporated herein by reference.

The as-synthesized zeolites treated in accordance with the present invention may be unbound zeolites, i.e. zeolites which have not been combined with an inorganic oxide matrix material such as alumina or silica-alumina. Preferably, said zeolites are treated to substantially remove organic obstructions from the zeolitic pores such as by calcination at temperatures ranging from about 200° to 600° C., preferably about 450° to 550° C., or by chemically breaking up the organic obstruction, say, for example, by exposing the zeolite to ozone. Alternatively, the zeolites may also be steamed prior to the treatment of the present invention. Steaming may take place by exposing the zeolite uncalcined or preferably, calcined, to a partial pressure of steam ranging from about 10 to 2000 kPa, preferably about 10 to 100 kPa, total pressures ranging from about 100 to 5000 kPa, preferably about 100 to 2000 kPa and temperatures ranging from about 400° to 750° C., preferably about 450° to 650° C. for a period of about 1 to 48 hours, preferably about 1 to 24 hours.

The method of the present invention is particularly useful for enhancing the sorption capacity of fresh unbound zeolites. Fresh zeolites are zeolites which have not been exposed to hydrocarbon conversion conditions. Accordingly, said zeolites have not been deactivated by carbonaceous residue deposition or metal agglomeration in the catalyst.

The zeolite is contacted with a liquid solution consisting essentially of aqueous ammonia of the above-specified pH ranges at a ratio Of about 1 part zeolite by weight to about 2 to 100, preferably about 5 to 20 parts of aqueous ammonia solution by weight. The contacting with aqueous ammonia is carried out at temperatures of about 25° to 110° C., preferably about 25° to 70° C., say at room temperature. The duration of this contacting step can range from about 1 to 168 hours or 2 to 200 hours, preferably about 2 to 48 hours, or until such time as an increase in hydrocarbon sorption capacity of the zeolite can be observed.

Hydrocarbons whose sorption by the zeolite is enhanced by the method of the present invention include cyclohexane, 2,2-dimethylbutane and para ethyltoluene. The sorption capacity of the treated zeolite may be determined by any suitable procedure including thermogravimetric analysis and gravimetry.

After contacting the zeolite with aqueous ammonia, the ammonia solution may be decanted off and the zeolite filtered and washed, for example with deionized water. The washed zeolite may thereafter be dried at a temperature between about 110° to 350° C., preferably about 110° to 250° C., for about 2 to 24 hours, preferably about 6 to 18 hours. The dried zeolite may thereafter be calcined under suitable conditions. Such conditions include temperatures of about 400° to 650° C., preferably about 450° to 650° C. and a duration of about 1 to 24 hours, preferably about 1 to 3 hours. The calcining may occur in an oxygen-containing atmosphere, for example, air or an inert atmosphere such as helium or nitrogen.

Figure 2:
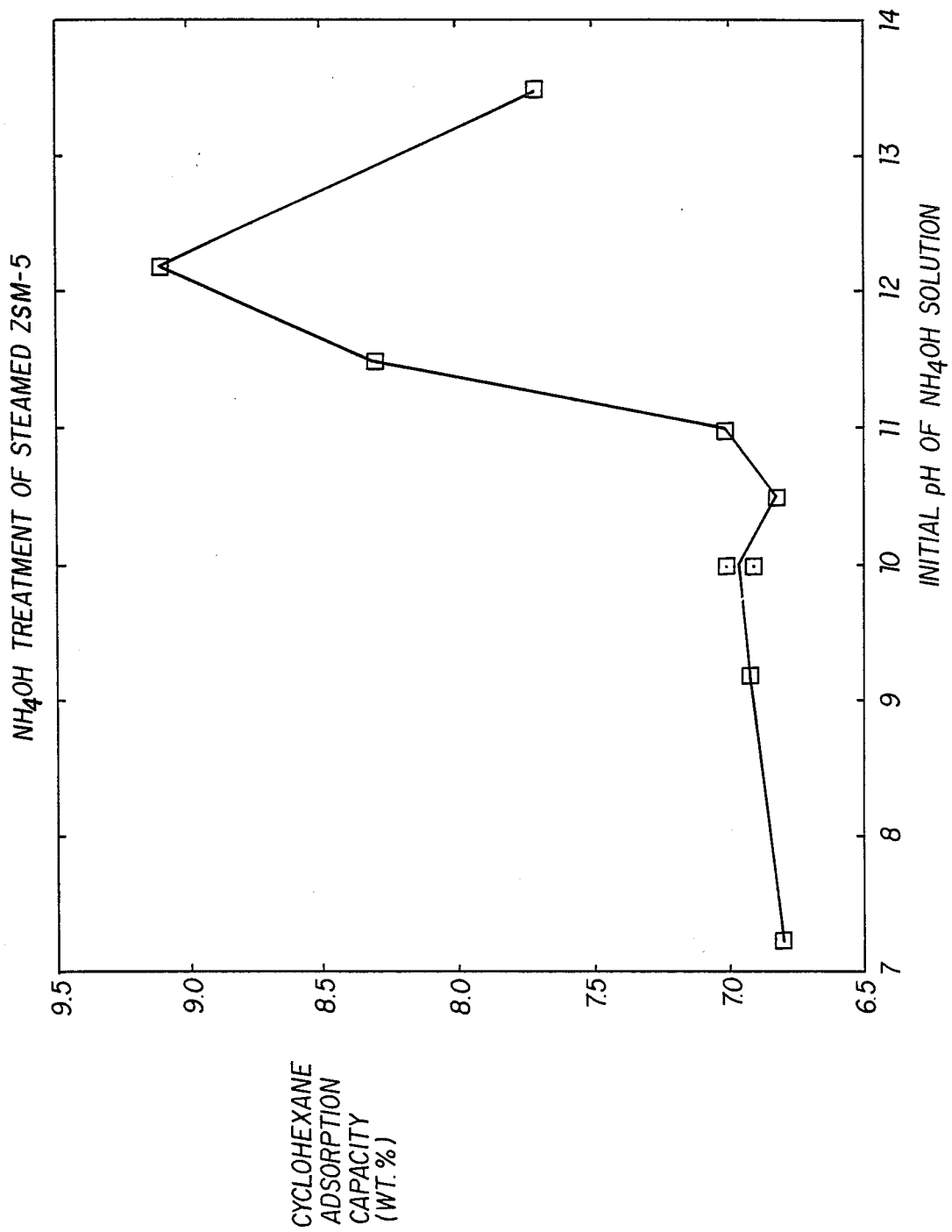
Figure 3:
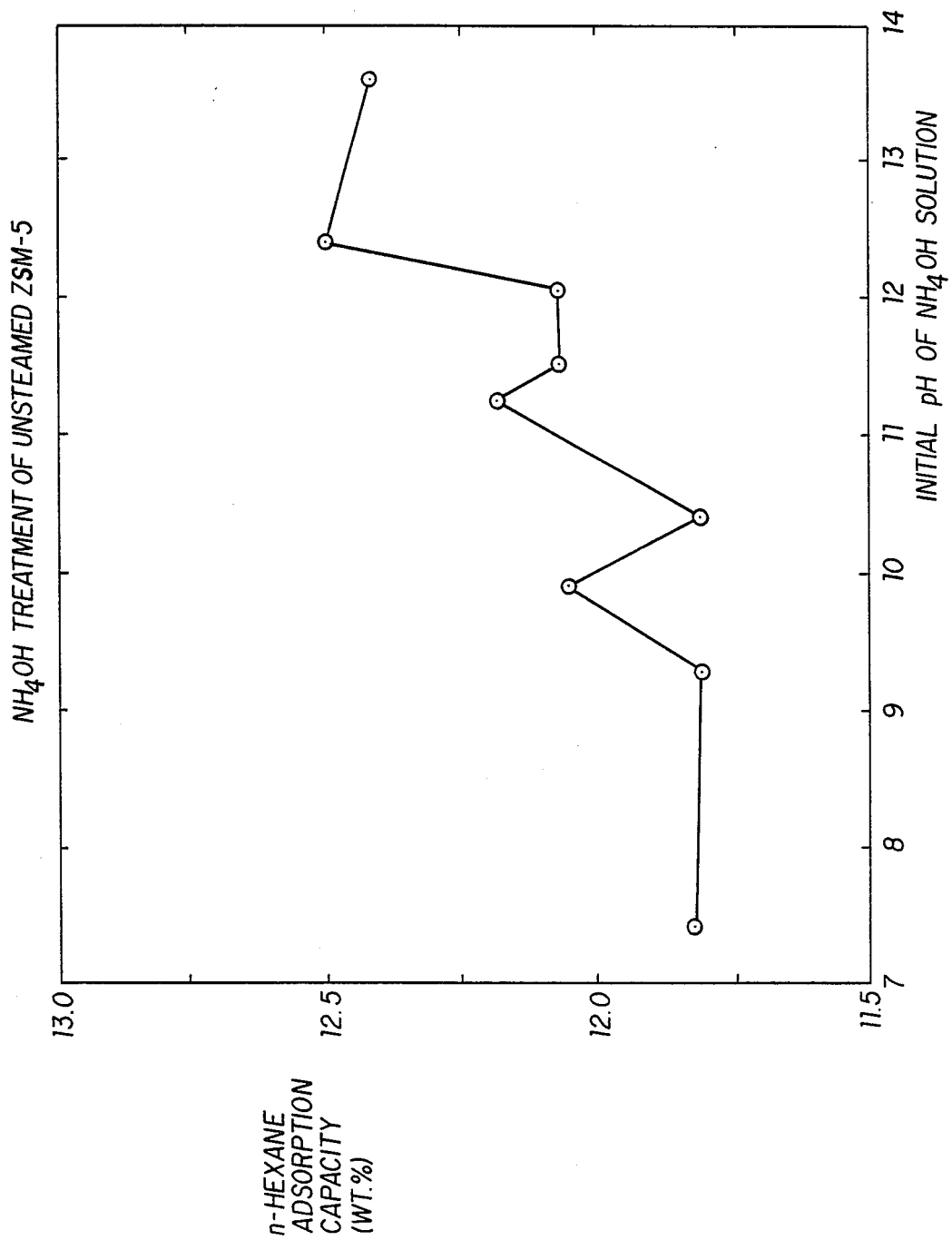
Figure 4:
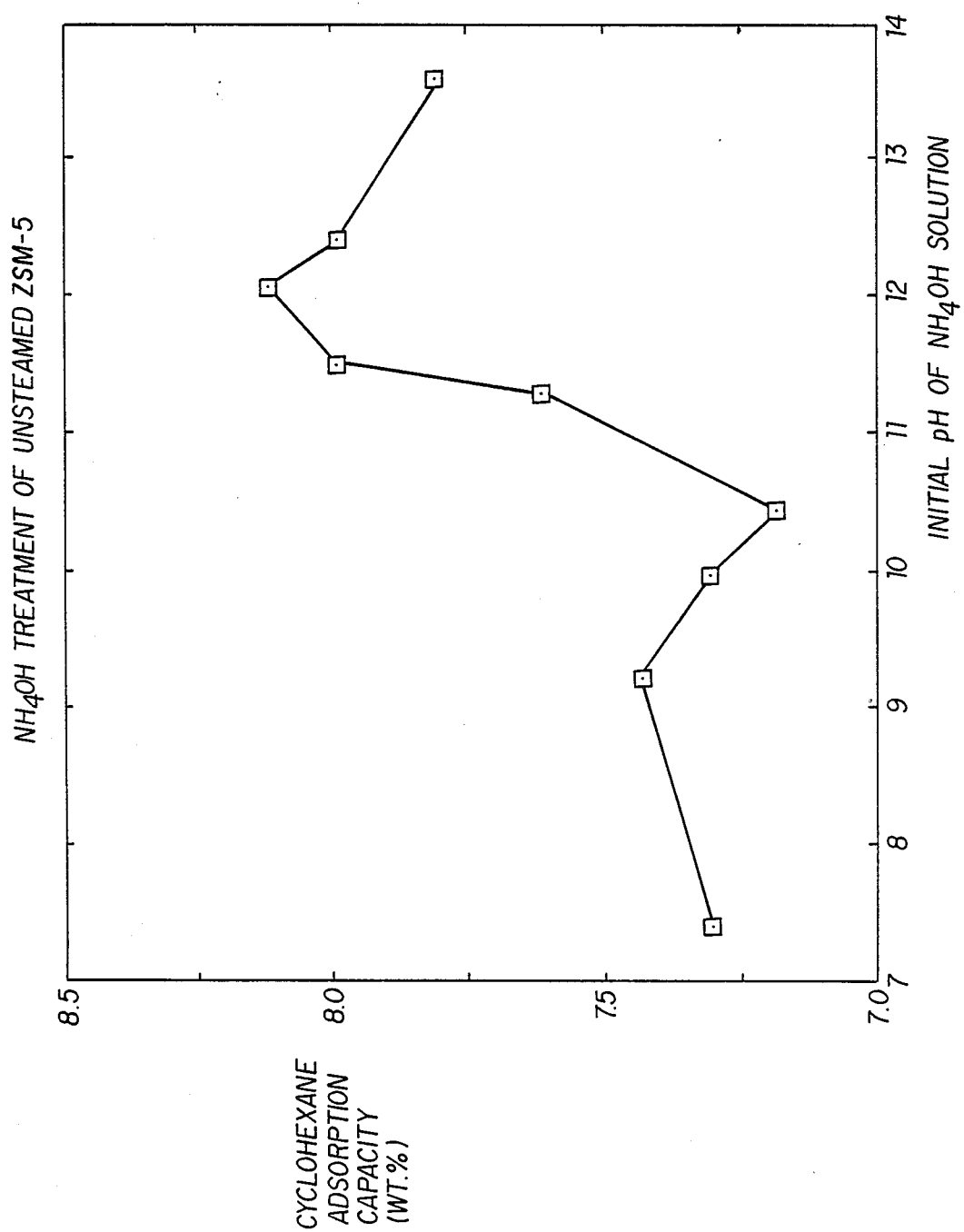
Figure 5:
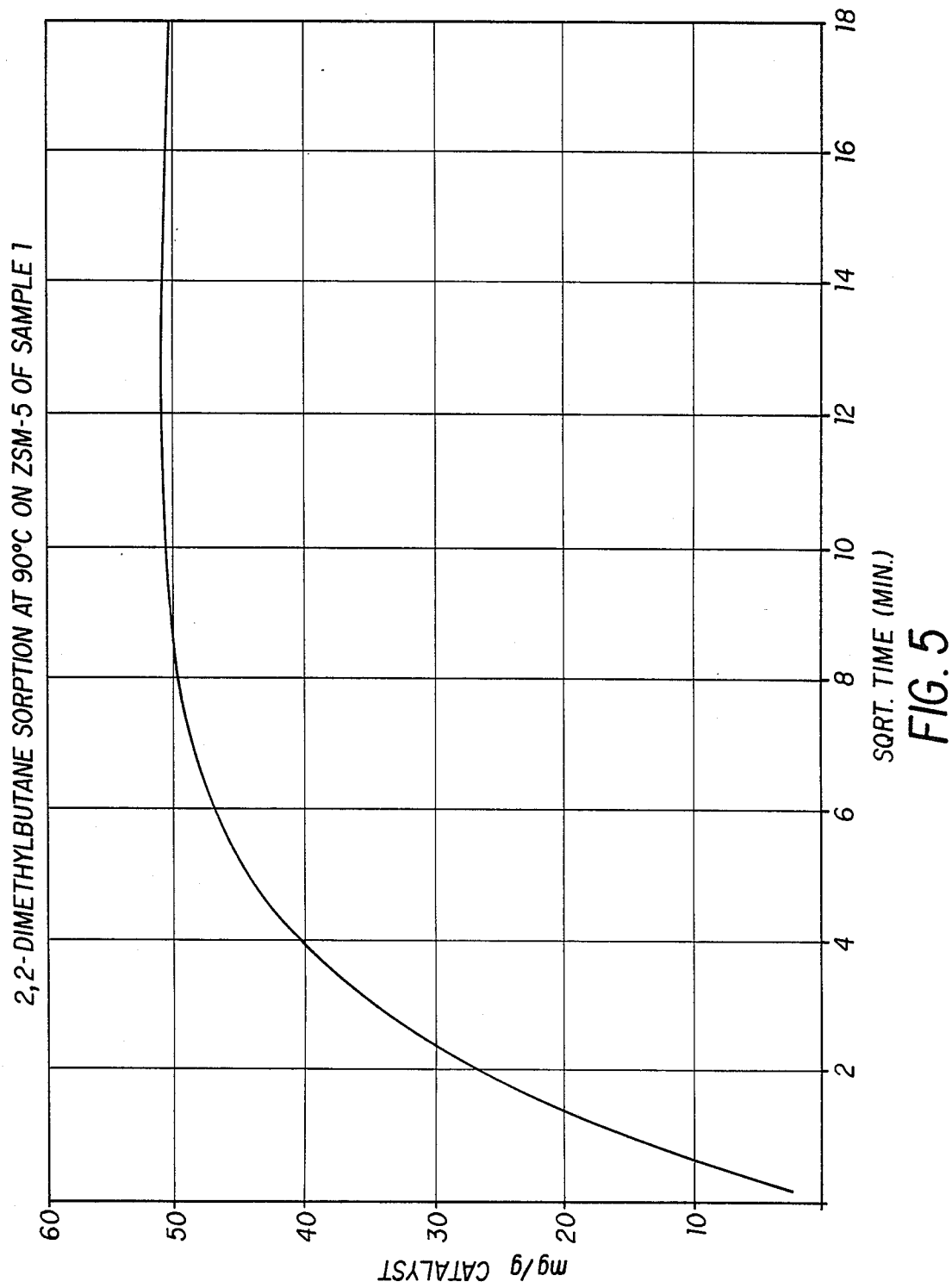
Figure 6:
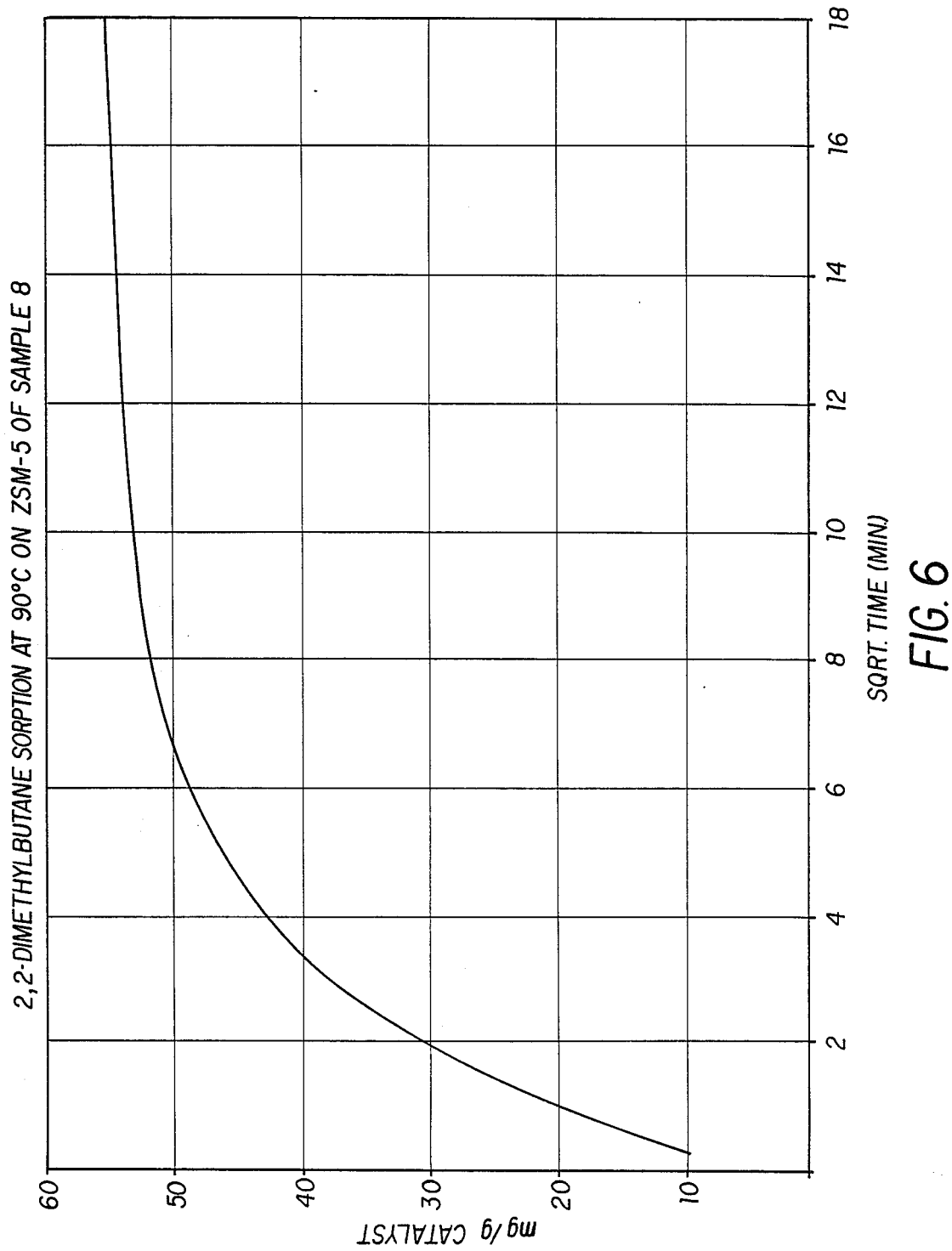

FIG. 1 depicts the hexane adsorption capacity of a steamed ZSM-5 sample plotted against the initial pH of the aqueous ammonia solution used. FIG. 2 depicts the cyclohexane adsorption capacity of a steamed ZSM-5 sample plotted against the initial pH of the aqueous ammonia solution used. FIG. 3 depicts the hexane adsorption capacity of an unsteamed ZSM-5 sample plotted against the initial pH of the aqueous ammonia solution used. FIG. 4 depicts the cyclohexane adsorption capacity of an unsteamed ZSM-5 sample plotted against the initial pH of the aqueous ammonia solution used. FIG. 5 is a comparative 2,2-dimethylbutane sorption rate plot for a steamed ZSM-5 exposed to aqueous ammonia solution having an initial pH of 7.2. FIG. 6 is a comparative 2,2-dimethylbutane sorption rate plot for a steamed ZSM-5 heat treated with an aqueous ammonia solution having an initial pH of 12.2.

The invention can be further described by the following example.

EXAMPLE

Eighteen ZSM-5 samples were prepared from a 21 weight percent solids forming mixture containing amorphous precipitated silica, aluminum sulfate, NaOH and $H_2O$ at a crystallization temperature of about 100° C. The resulting zeolite had a crystal size of about 0.2 to 0.5 microns and a low sodium content, about 0.03 weight percent (300 ppm). The zeolite samples were then calcined in an atmosphere of $N_2$ when in air for about 6 hours at a temperature of about 540° C. in order to remove organics. Nine of the calcined zeolite samples were then steamed at about 540° C. for about 10 hours at atmospheric pressure. Each sample, both steamed and unsteamed, was then added to an aqueous ammonia solution having an initial pH ranging from 7.2 to 13.9, as specified in Table 1 below, in the proportion of one gram of zeolite per 100 ml of solution. The zeolites remained in the aqueous solution at room temperature for about 7 days. The aqueous ammonia was then decanted and the treated zeolites were filtered and rinsed with deionized water and then dried at about 120° C. (250° F.) for about 16 hours. After drying, the zeolite samples were calcined in air at 540° C. (1000° F.) for about three hours.

The sorption capacity of each zeolite sample was determined by measuring the change in weight of the calcined zeolite upon exposure to either n-hexane or cyclohexane vapor at 90° C. and a hexane or cyclohexane partial pressure of 40 torr.

The sorption capacity of each zeolite sample is shown in Table 1 below.

TABLE 1

Adsorption and pH Measurements of NH$_4$OH Treated Samples

ZSM-5 Steamed for 10 hrs at 1000° F., 100 kPa

| Sample | Solution pH Initial | Solution pH Final | Sorption (wt %) CyC$_6$ | Sorption (wt %) n-C$_6$ |
|---|---|---|---|---|
| 1 | 7.2 | 6.24 | 6.8 | 11.2 |
| 2 | 9.2 | 7.25 | 6.9 | 11.1 |
| 3 | 10.0 | 9.32 | 7.0 | 11.3 |
| 4 | 10.0 | 9.41 | 6.8 | 11.2 |
| 5 | 10.5 | 9.62 | 6.8 | 11.2 |
| 6 | 11.0 | 10.91 | 7.0 | 11.4 |
| 7 | 11.5 | 11.41 | 8.3 | 11.9 |
| 8 | 12.2 | 12.07 | 9.1 | 12.4 |
| 9 | 13.5 | 13.39 | 7.2 | 11.2 |

Unsteamed ZSM-5

| Sample | Solution pH Initial | Solution pH Final | Sorption (wt %) CyC$_6$ | Sorption (wt %) n-C$_6$ |
|---|---|---|---|---|
| 10 | 7.43 | 5.60 | 7.3 | 11.8 |
| 11 | 9.24 | 5.71 | 7.4 | 11.8 |
| 12 | 9.90 | 6.00 | 7.3 | 12.1 |
| 13 | 10.39 | 9.78 | 7.2 | 11.8 |
| 14 | 11.27 | 11.03 | 7.6 | 12.2 |
| 15 | 11.55 | 11.30 | 8.0 | 12.1 |
| 16 | 12.05 | 11.68 | 8.1 | 12.1 |
| 17 | 12.41 | 11.87 | 8.0 | 12.5 |
| 18 | 13.91 | 12.96 | 7.8 | 12.4 |

In FIGS. 1 and 3, the hexane adsorption capacity (weight percent) of each steamed (FIG. 1) and unsteamed (FIG. 3) ZSM-5 sample was plotted against the initial pH of the aqueous ammonia solution used to treat each sample. In FIGS. 2 and 4, the cyclohexane adsorption capacity (weight percent) of each steamed (FIG. 2) and unsteamed (FIG. 4) ZSM-5 sample was plotted against the initial pH of the aqueous ammonia solution used to treat each sample. The figures show that the steamed catalyst exhibits the greatest sorption capacity enhancement after treatment. Cyclohexane and hexane capacities increase by as much as 34 and 11% respectively for the steamed catalysts compared to 12 and 6% for the unsteamed catalysts. ZSM-5 samples treated in the 12 to 13 pH solutions exhibit the maximum sorption capacity although some enhancement is observed at pH values as low as 10.5. Above a pH of 13 the cyclohexane and hexane sorption capacities fall off somewhat but still remain above untreated zeolite values.

The alpha activities of the treated steamed zeolites (Samples 1 to 9) were determined by n-hexane cracking at 530° C. As is well known in the art, the alpha activity gives an approximate indication of the catalytic cracking activity of the catalyst compared to a standard catalyst and it gives the relative rate constant (rate of normal hexane conversion per volume of oxide composition per unit time). It is based on the activity of the highly active silica alumina cracking catalyst taken as an alpha of 1. This test is described in U.S. Pat. No. 3,354,078 and in "The Journal of Catalysis", Vol. 4, pp. 522–529, August 1965. The sodium contents of the steamed zeolite samples were determined by X-ray fluorescence and the silica to alumina molar ratios determined by elemental analysis.

Table 2 shows that the cracking activities of the steamed samples parallel their sorptive capacities; both increase with NH$_4$OH concentration of the treating solution. Cracking activities, like the sorptive capacities, pass through a maximum at a pH of about 12. This increase in cracking activity apparently is not due to removal of sodium by NH$_4+$ exchange, as can be seen in the relative constancy of the Na concentration of all nine steamed samples. Also, SiO$_2$/Al$_2$O$_3$ ratios determined by elemental analyses are directionally opposite to what would be expected from the alpha measurements because higher SiO$_2$/Al$_2$O$_3$ ratios normally correspond to lower hexane activities.

FIGS. 5 and 6 are the comparative 2,2-dimethylbutane sorption rate plots (at 90° C.) for samples 1 (treatment pH=7.2) and 8 (treatment pH=12.2 ). 2,2-dimethylbutane is a sensitive probe for measuring the diffusion rates of hydrocarbons into ZSM-5. From these figures, the 2,2-dimethylbutane diffusivities were calculated to be $6.1 \times 10^{-4}$ and $8.2 \times 10^{-4}$ sec$^{-1}$ for samples 8 and 1 respectively. These diffusivities are within the range of error of the test and therefore can be considered to be equivalent. Furthermore, the (90° C.) 2,2-dimethylbutane sorption capacity of the NH$_4$OH treated material (sample 8) is 15% higher than that of the non-alkaline treated material (sample 1) which is consistent with the cyclohexane and n-hexane data shown in Table 1.

A zeolite, particularly ZSM-5, with higher hydrocarbon sorption capacity should be a more effective catalyst for hydrocarbon conversion reactions where both shape selectivity and accessibility to the acid sites are critical. Moreover, since this method of enhancing sorption capacity appears to work most effectively on steamed catalysts, it may be a means for restoring additional activity to regenerated catalysts that have suffered steam damage.

TABLE 2

Physical and Catalytic Properties of NH$_4$OH Treated ZSM-5 (Steamed) Samples

| Sample | SiO$_2$/Al$_2$O$_3$ (Elemental) | α | Na ppm |
|---|---|---|---|
| 1 | 55 | 24 | 80 |
| 2 | 61.2 | 27 | 80 |
| 3 | 71.8 | — | 85 |
| 4 | 73.9 | — | 95 |
| 5 | 76.5 | — | 85 |
| 6 | 71.8 | — | 110 |
| 7 | 70.8 | 36 | 75 |
| 8 | — | 35 | 85 |
| 9 | 73.7 | 32 | 155 |

| | 2,2-DMB Diffusivity (sec$^{-1}$) |
|---|---|
| 1 | $8.2 \times 10^{-4}$ |
| 8 | $6.1 \times 10^{-4}$ |

What is claimed is:

1. A method for increasing the hydrocarbon sorption capacity of a fresh as-synthesized zeolite having a silica to alumina molar ratio of at least 12, a constraint index ranging between about 1 and 12 and an alkali metal content less than about 1000 ppm which comprises treating the zeolite by calcining to substantially remove organic obstructions within the zeolite pores and contacting the treated zeolite with a liquid solution consisting of aqueous ammonia having a pH between about 10.5 and about 14 at a temperature between about 25° to about 110° C. for about 2 to about 200 hours, wherein said zeolite is steamed prior to said contacting.

2. The method of claim 1 wherein said steaming is carried out at temperatures ranging between about 450° to about 650° C. and partial pressures of steam ranging between about 100 to 2000 kPa for about 1 to about 48 hours.

3. The method of claim 1 wherein said zeolite is selected from the group consisting of ZSM-5, ZSM-11, ZSM-5/ZSM-11 intermediate, ZSM-12, ZSM-23, ZSM-35, ZSM-38, and ZSM-48 and said alkali metal content is less than about 300 ppm.

4. The method of claim 3 wherein said zeolite is ZSM-5.

5. The method of claim 1 wherein said pH is between about 12 and about 13.

6. The method of claim 1 wherein the zeolite after said contacting is filtered, washed, dried, and calcined.

7. A method for increasing hydrocarbon sorption of an as-synthesized ZSM-5 zeolite having an alkali metal content less than about 1000 ppm which has been calcined and then steamed which comprises contacting said steamed zeolite with a liquid solution consisting essentially of aqueous ammonia having a pH between about 10.5 and about 14.

8. The method of claim 7 wherein said contacting occurs at a temperature between about 25° and about 110° C. and a pressure between about 100 and about 1000 kPa for about 2 to 200 hours.

9. The method of claim 8 wherein said contacting occurs at a temperature between about 25° and about 70° C. and a pressure between about 100 kPa and about 500 kPa for about 2 to 48 hours and said alkali metal content is less than about 300 ppm.

10. The method of claim 8 wherein said pH is between about 12 and about 13.

11. A method for increasing hydrocarbon sorption of an as-synthesized highly siliceous zeolite containing organic obstructions within the zeolite pores, having a silica to alumina molar ratio of at least about 12, a constraint index of 1 to 12 and an alkali metal content of less than about 1000 ppm which comprises calcining said zeolite at about 450° to 650° C., so as to substantially remove said organic obstructions, contacting said zeolite with a liquid solution consisting essentially of aqueous ammonia, having a pH of about 10.5 to about 14, at a temperature between about 25° to about 110° C. for about 2 to 200 hours, separating said zeolite from said solution, washing said zeolite, drying said zeolite at about 110° to 350° C. and calcining said zeolite in an oxygen-containing atmosphere for about 1 to 3 hours at temperatures ranging between about 450° C. and 650° C., wherein said zeolite is steamed prior to said contacting.

12. The method of claim 11 wherein said zeolite is steamed at a temperature of about 400° to 750° C. at a steam partial pressure of about 10 to 2000 kPa for about 1 to 48 hours prior to said contacting with an aqueous ammonia solution.

13. The method of claim 12 wherein said zeolite is ZSM-5.

14. The method of claim 11 wherein said alkali metal content is less than about 300 ppm.

* * * * *